Oct. 31, 1967     G. E. GROSHEIM ETAL     3,349,665
CHARACTERIZING LIGHT REFLECTING PROPERTIES OF A SURFACE
Filed May 19, 1964     2 Sheets-Sheet 1
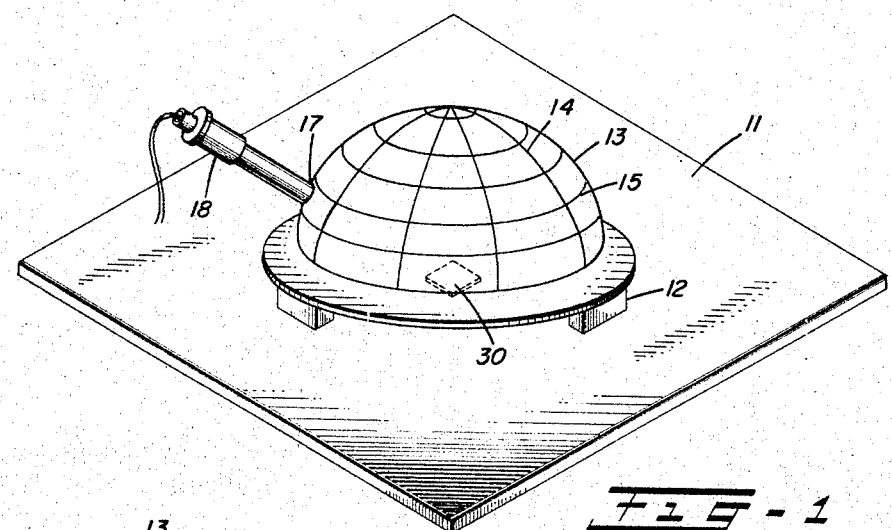
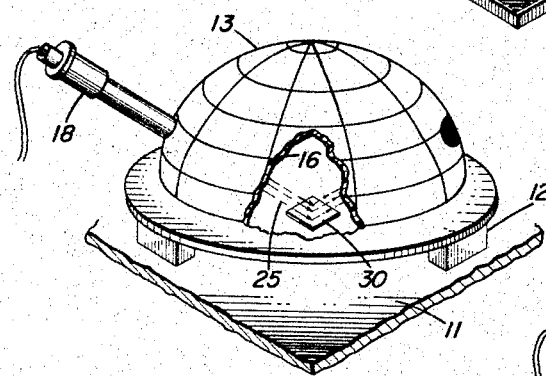
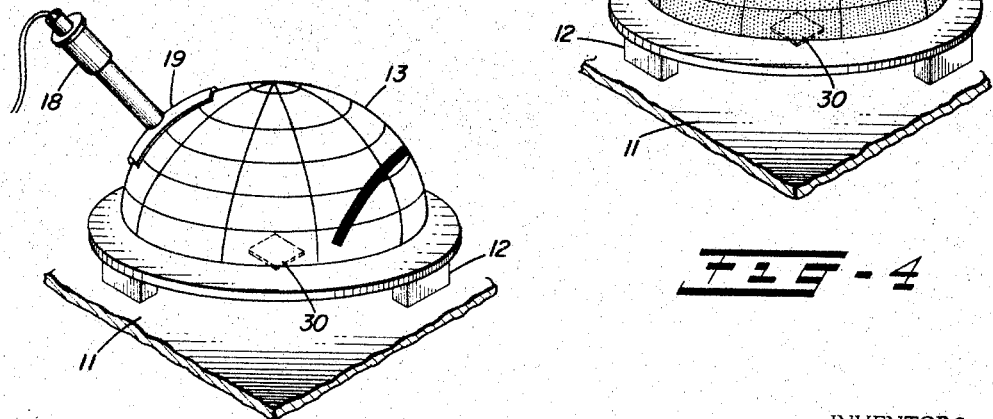
INVENTORS.
GENE EDWARD GROSHEIM
CLARK THOMAS HICKS
BY
*Samuel Branch Walker*
ATTORNEY Oct. 31, 1967  G. E. GROSHEIM ETAL  3,349,665
CHARACTERIZING LIGHT REFLECTING PROPERTIES OF A SURFACE
Filed May 19, 1964  2 Sheets-Sheet 2
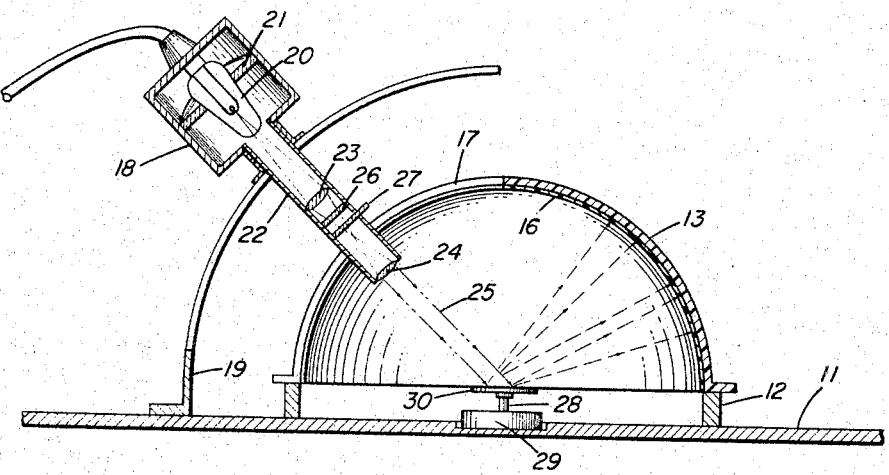
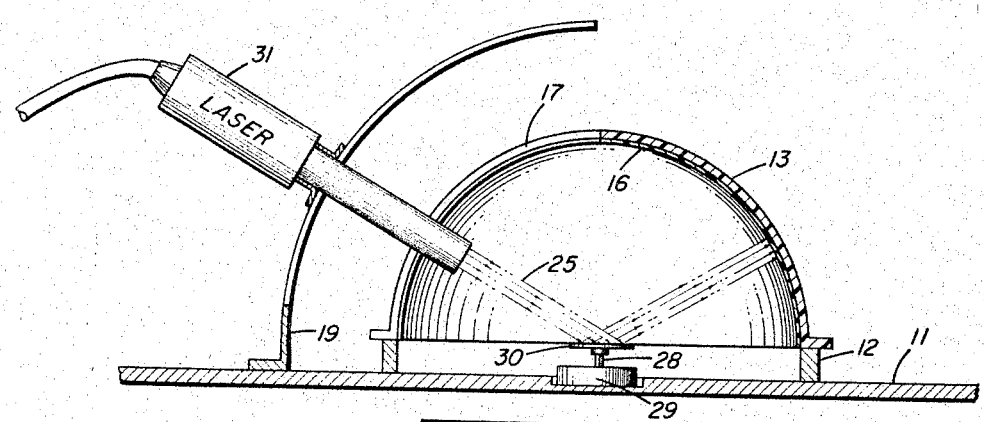
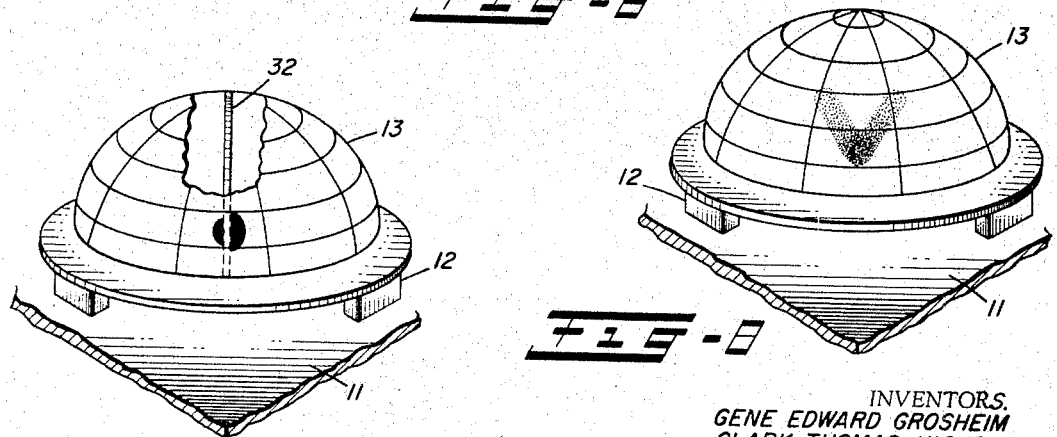
INVENTORS.
GENE EDWARD GROSHEIM
CLARK THOMAS HICKS
BY
Samuel Branch Walker
ATTORNEY

United States Patent Office 3,349,665
Patented Oct. 31, 1967

3,349,665
CHARACTERIZING LIGHT REFLECTING
PROPERTIES OF A SURFACE
Gene Edward Grosheim, Cincinnati, Ohio, and Clark
Thomas Hicks, Highland Heights, Ky., assignors to
Formica Corporation, Cincinnati, Ohio, a corporation of Delaware
Filed May 19, 1964, Ser. No. 368,577
2 Claims. (Cl. 88—14)

This invention relates to an apparatus and method for determining the effect of the surface of a material on incident light by impinging a beam of light, preferably essentially collimated, and optionally monochromatic, polarized and/or coherent at a selected angle, conveniently about 60° with a line normal to the surface, on a sample, preferably a flat surface, of the material under consideration, and observing the pattern and characteristics of the light reflected from the surface in elevation and azimuth on the surface of a surrounding dome, preferably hemispherical, with the point of impingement of light on the sample, preferably at the center of the hemisphere. The entire pattern is simultaneously displayed and may be viewed by several observers simultaneously and photographed.

In the manufacture of plastic laminates, and painted, enameled, varnished or otherwise coated surfaces of wood, metal or other material, including electroplated, electroetched, and mechanically worked surfaces, including brushed or ground surfaces, and fabrics, paper and plastics, the effect of the surface on incident light is of commercial importance. The appearance of the surface varies markedly with the effect of the surface on incident light and the angle of incidence and observation. For different purposes and at different times the primary interest may be in the spectral reflection or the gloss, glare, sheen, reflection or luster of the surface, and may be of primary interest when viewed by white light or light from common sources, such as sunlight, incandescent light, fluorescent lights, or colored lights, where the color may be monochromatic or polychromatic, and where the incident light may be polarized and/or coherent and/or collimated or diffused or mixed. Frequently the primary interest is in the appearance of the surface under random ordinary conditions of illumination, which is non-polarized, non-coherent, non-collimated light from one or more sources, direct or diffused. This includes, for example, the combined light from sun and sky; or from one or more incandescent lights in part reflected from the walls of a room, or from the combined light of sky and artificial illumination. To secure uniformity of appearances, or a desired appearance under such random light sources, the interaction from individual specialized sources may be measured, and the interaction determined for each of a plurality of conditions, with integrated results being used to approximate the final results from such random sources. Usually the appearance to the normal human eye is of importance. The normal human eye varies in response at different wavelengths of light, and is far from a precise instrument. Additional complications are introduced if the surface has fluorescent characteristics, and if the light source has energy at wavelengths to excite such fluorescence.

In the past, measurements of reflection characteristics have frequently been made by impinging a beam of white light at an angle on to the surface and then photometrically measuring the reflected light in azimuth or elevation, or both, and plotting the individual curves. In the interest of saving time, usually only the reflection along the plane containing the incident beam and a perfectly reflected light ray, and a plane at right angles thereto, and containing the perfectly reflected ray are measured. For determining these angles, the incident beam is considered as the centerline of the incident beam, and the specular ray or perfectly reflected ray is the reflection from a perfect mirror in the sample position. Such a system of measurement is extremely time consuming and so tedious as to rapidly lose commercial significance. This is particularly true if the surface characteristics have a different effect on light, depending upon the azimuth of the light with respect to the sample or if the characteristics vary with different wavelengths, or polarization. Little has been written about the effects of coherent light on reflection characteristics of random surfaces, particularly at high intensities.

It has now been found that a single observation of the entire reflection from a surface may be observed at one time. This is accomplished by illuminating a sample of the surface under consideration by a beam of light of selected characteristics and surrounding the surface by a dome having diffusion characteristics. As one of the principal purposes of observation is to determine how a sample will appear in usage under various light sources, the incident light on the sample is chosen to include either the illumination selected for test purposes to match a particular illumination or the illumination is of a selected portion, as for example, monochromatic, polarized or coherent light, and by determining the effect of each type of illumination, integrated values for any assumed characteristics of incident light can be determined.

The test surface is conveniently although not necessarily flat. Conveniently, the test surface is the surface of a laminate such as any of the decorative plastic laminates or a fabric or a painted, varnished or otherwise coated surface of any selected type of material. The sample may be an optical element such as a diffraction grating or an imperfect diffraction grating or a multi-layered coated filter. The characteristics of such surfaces are of interest to determine their effect on an incident beam or to determine the characteristics of the incident beam or, as an instructional device, to assist students to understand the effects of such surfaces on light beams. The light beam itself may, in fact, include energy at wavelengths outside of the visible range if the surface of the diffusion hemisphere is coated with a fluorescent material to detect such radiation or if the sample changes the radiation so as to be visible, or if a camera with a film sensitized to particular radiation or other detector is used in determining the radiation, on those portions of the hemisphere for which data are desired.

The apparatus, its construction and method of operation are further exemplified in detail by modifications thereof in the accompanying drawings in which:

FIGURE 1 is an assembled view of the apparatus complete.

FIGURE 2 is a partly cut away view showing the effect of a mirror-like sample on the incident light beam.

FIGURE 3 is a view showing an adjustable angle of incidence for the source and the effect of a sample having a brushed surface, with the brushing across the plane of reflection.

FIGURE 4 is a view showing the effect on the light beam of a matte surface.

FIGURE 5 is a sectional view of one embodiment of the present invention using an incandescent source.

FIGURE 6 is a sectional view showing a laser source.

FIGURE 7 is a view of the illuminated diffusion hemisphere showing an optically black divider with two different samples having similar characteristics, one being slightly more matte.

FIGURE 8 is a view showing a pattern of illumination such as may be obtained by a cross-brushed sample, or a fabric.

As shown in FIGURE 5, on a support table 11 is mounted a dome support 12 on which is mounted a diffusion dome 13. The diffusion dome is preferably a hemisphere of a transparent material; preferably the diffusion dome is made from a plastic such as a colorless polyacrylate, although other plastics or glass are suitable. The acrylic resins are easily formed and of light weight. A glass hemisphere dome gives excellent results but is more subject to breakage. Whereas the dome is shown as hemispherical, with meridian lines 14, and latitude lines 15, a dome which is a portion only of a hemisphere gives the same results over a more restricted area which, for many purposes, is adequate. The hemisphere gives the complete story for 360° of azimuth and all 90° of elevation. One surface, preferably the interior of the dome, is coated with a translucent diffusion coating. Conveniently, this may be of a material such as "Tempra," translucent white water color paint, but other coating material may be used which has a uniform spectrophotometric character and uniform light transmission characteristics. In a preferred embodiment the light transmission through this layer is uniform over the entire dome, and non-directional, so that it may be viewed from any angle and appear the same. This layer may have a fluorescent material incorporated therein if visible observation is desired of radiation outside of the visible spectrum. Usually it is desired that this coating have no effect on the spectral characteristics of light, but serve merely to diffuse the light. The functioning of the diffusing layer may be likened to the inside frosting on an electric light bulb where the frosting is heavy enough so that the entire surface appears uniformly illuminated when viewed from any angle as contrasted with some of the older frosted light bulbs in which a "hot spot" could be seen because diffusion was incomplete.

The coating may be applied also by using magnesium oxide from burning magnesium which has long been recognized for its purity of whiteness. Magnesium oxide is comparatively difficult to spread evenly on the inside of the dome to give uniform diffusion characteristics. Barium sulfate dispersed in water with methyl cellulose is readily sprayable and gives a good diffusion coating. The dome itself may be of a diffusing plastic like opal glass or a white translucent polyacrylate.

In one side of the diffusion dome is an aperture 17 for a light source 18. The aperture needs to be big enough to permit the entrance of the light at a desired angle. Where a single angle of incidence is used the aperture need not be big enough for adjustment. In FIGURE 5 the aperture is shown as a slot, adjacent to which is a light source support 19, which permits the light source to be directed radially into the dome at any angle from nearly horizontal to vertical. In FIGURE 5 the light source 18 consists of an incandescent bulb 20, which preferably has a compact filament such as is normally used for projection lamps. A reflector 21 reflects part of the light back towards the filament and increases the apparent intensity of the source. The light from the bulb passes down a direction tube 22, which contains a condensing lens 23 and an objective lens 24. Preferably these lens and their spacing is chosen so that the light from the source is a compact beam 25 of essentially collimated light. The accuracy of collimation depends in part on the use to be made. For many purposes the light source is satisfactory even if part of the light is as much as 5 or 10° from parallel to the axis. If comparative data only is desired, the spread may be even greater, if consistent between sample observations. An electric arc, such as a carbon arc or Xenon arc bulb, or gas glow tube may be used as the source if the spectral characteristics of such source are suitable for the collection of information desired. At a particular small point source a zirconium arc or high intensity iodine lamp gives good results.

In the director tube there may be optionally placed a filter 26 and a polarizer 27. The filter may be a multiple thin layer filter or colored glass or colored gelatin filter whose wavelength pass characteristics are such that the light beam has a desired spectral quality. For some purposes it is desired to use three complementary filters serially to provide three different light beams which may conveniently be such as to permit evaluation at three frequencies having a chosen relationship, such as for use in a tristimulus calculation or color printing. The polarizer, conveniently, is one which can be rotated to give any desired direction of polarization of light in order that the effect of different axes of the polarized light beam may be studied.

Just below the center of the hemisphere is a sample support 28. Conveniently, but not necessarily, the sample support is provided with a rotor 29, to permit the sample to be rotated about its axis at a desired speed. The sample support is preferably just far enough below the center of the hemisphere so that when the sample 30 is placed on the sample support, the light reflecting surface is at the center of the hemisphere and in the plane of the lower face of the hemisphere. Preferably the beam of collimated light hits the sample centrally of the support so that the center of the light beam intersects the sample at the center of the hemisphere.

As the device is frequently used for comparative results, that is matching a test specimen against the standard, deviations from parallelicity of the light or errors in placement of the light beam or the sample tend to cancel out if consistent placement is used. Collimated light at the center of the hemisphere permits reproducibility of results, particularly between different instruments at different times and is, therefore, naturally to be preferred. The device is extremely useful, even if not accurately aligned.

In the modification shown in FIGURE 6 a laser 31 is used as the light source. Light from a laser is frequently well collimated and monochromatic. If a gas laser is used the light is non-polarized but if a solid-state laser is used the light may be polarized as well as monochromatic. Light from a laser is normally coherent and can be very intense. A laser source is limited in wavelength and, accordingly, where a wide spectral band of light is preferred, a light source having a broader spectrum is preferred. Obviously the spectral characteristics of the light source can be chosen for any particular purpose where surface characteristics at a particular wavelength or group of wavelengths is under consideration.

In the modification shown in FIGURE 7, an optically black shield 32 is used to divide the hemisphere and the beam of light so that two different samples may be placed on the two sides of the shield, and each side of the hemisphere will be symmetrically illuminated by the light reflected from the sample on that side. This modification is particularly useful where the characteristics of two samples are to be compared as the apparatus is essentially symmetrical with respect to the optically black shield and, hence, if the samples are in fact identical, both halves of the hemisphere will be symmetrically illuminated.

As shown in FIGURE 7, the spots of reflected light are of different size, the one on the left being smaller and more intense, with the one on the right being somewhat larger due to a slight diffusing effect of the sample on that side.

In FIGURE 8 the light spot is spread in the shape of a V. Such a choice may be obtained from some textiles or from a metal surface which has been brushed in two directions so that light is more selectively scattered in each of two directions at right angles than off these axes.

The intensity of the reflected pattern varies with the source and degree of diffusion. A single spot from a mirror, or small polished flat surface, as in FIGURE 2, is bright. A diffuse reflection, from a rougher surface, such as shown in FIGURE 4 lights up nearly the entire interior of the dome, and is relatively much dimmer.

Goniophotometric curves can be plotted by moving a photocell in desired paths over the surface of the dome, to show light patterns along such paths. More frequently visual or photographic observation is adequate to secure desired information.

The completeness, accuracy and adjustability required of the apparatus varies with intended use. It is extremely helpful to be able to place a plastic laminate sample on the support and rotate the laminate to determine if the surface is uniform in all directions. Similarly, the effect of polarized light or monochromatic light is of interest. Some samples may have different reflection characteristics for the various hues and different characteristics for polarized light.

A movie camera or still camera can be used to record the appearance of the surface of the dome and the latitude and meridian lines on the surface of the dome permit easy evaluation of the angles.

Because the angle of the incidence of the light may be readily varied, as may polarization and color, it is frequently desirable to use an angle of 60° from the perpendicular to the sample as a standard practice when white light is used as the source. Other angles and hues have particular application where specialized information is desired.

The American Society for testing materials Standards E–179–61T title, "Selection of Geometric Conditions For Measurement of Reflectance and Transmittance," gives certain angles which have been used in such measurements, including 20° and 60°, most commonly in plastics, 45°, 57½°, 75° and 85°. 85° is used primarily for sheen.

It is to be appreciated that surface roughness and texture attributes and their effect on reflected light are quite important in many finishing operations. Similarly, the use of the apparatus in FIGURE 7 with varying light sources, that is sources having different spectral characteristics or polarization, permits a ready determination of metamerism, that is detection of surfaces which look alike under one light source but which look differently when viewed by different light sources. A study of the spectral reflection characteristics gives a rapid method of evaluating why such surfaces appear differently under different conditions.

The present apparatus and method are capable of a wide variety of uses, depending upon the information which may be desired. For some purposes no adjustability is required and a low order of accuracy can give comparative results. For other applications the utmost of precision and adjustability gives commensurately more valuable information. Such variations in the scope of the invention, as set forth in the appended claims, are obvious to those skilled in the art.

We claim:

1. An apparatus for characterizing the light reflecting characteristics of a surface comprising a sample support, means to rotate said sample support about an axis perpendicular to the sample surface, means to direct a beam of essentially parallel, monochromatic, coherent, polarized light at an adjustable angle onto the surface of a sample, and a diffusion hemispherical dome, consisting of a transparent support having diffusion characteristics, over the sample support in such a position that the light impinges on the sample surface at the center of the hemisphere, and the reflected light is diffused by the dome, so the intensity and quality of reflected light in any direction is at once apparent.

2. An apparatus for characterizing the light reflecting characteristics of a surface comprising a sample support, means to direct a beam of essentially parallel light onto the surface of a sample, and a diffusion dome, consisting of a transparent support having diffusion characteristics, over the sample support in such a position that the light impinges on the sample surface at the center of the dome, and the reflected light is diffused by the dome, so the intensity and quality of the reflected light in any direction is at once apparent.

No references cited.

JEWELL H. PEDERSEN, *Primary Examiner.*

C. E. QUARTON, *Assistant Examiner.*